(12) United States Patent
Waller et al.

(10) Patent No.: US 9,069,499 B2
(45) Date of Patent: Jun. 30, 2015

(54) PRINT PROCESSING NETWORK

(75) Inventors: Marquis G. Waller, Beverly, OH (US); Joseph P. Gaertner, Lafayette, CO (US); Jon A. Meilstrup, Longmont, CO (US); Brian P. Doyle, Boulder, CO (US); Linda S. Liebelt, Boulder, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 715 days.

(21) Appl. No.: 13/053,725

(22) Filed: Mar. 22, 2011

(65) Prior Publication Data

US 2012/0243026 A1    Sep. 27, 2012

(51) Int. Cl.
*G06F 15/00* (2006.01)
*G06K 1/00* (2006.01)
*G06F 3/12* (2006.01)

(52) U.S. Cl.
CPC ............ *G06F 3/1207* (2013.01); *G06F 3/1229* (2013.01); *G06F 3/1259* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 5,923,826 A | 7/1999 | Grzenda et al. | |
| 5,923,834 A | 7/1999 | Thieret et al. | |
| 6,453,127 B2 | 9/2002 | Wood et al. | |
| 7,006,890 B2 | 2/2006 | Foygel | |
| 7,019,863 B2 | 3/2006 | Mathieson | |
| 7,212,303 B2 * | 5/2007 | Iida | 358/1.15 |
| 7,274,477 B2 | 9/2007 | Reese et al. | |
| 7,474,425 B2 | 1/2009 | Sasama | |
| 7,602,514 B2 | 10/2009 | Levin et al. | |
| 7,839,511 B2 | 11/2010 | La Rosa Ducato et al. | |
| 2004/0181602 A1 * | 9/2004 | Fink | 709/229 |
| 2005/0117176 A1 * | 6/2005 | Benz et al. | 358/1.15 |
| 2005/0174599 A1 * | 8/2005 | Ferlitsch | 358/1.15 |
| 2007/0188791 A1 * | 8/2007 | Utsunomiya et al. | 358/1.13 |
| 2007/0236708 A1 | 10/2007 | Jahn et al. | |
| 2010/0073707 A1 | 3/2010 | Ferlitsch | |
| 2010/0091318 A1 | 4/2010 | Ferlitsch | |
| 2010/0302579 A1 * | 12/2010 | Nuggehalli et al. | 358/1.15 |
| 2010/0309508 A1 * | 12/2010 | Kamath et al. | 358/1.15 |
| 2011/0299110 A1 * | 12/2011 | Jazayeri et al. | 358/1.15 |
| 2012/0075662 A1 * | 3/2012 | Giannetti | 358/1.15 |
| 2012/0188587 A1 * | 7/2012 | Gaertner et al. | 358/1.15 |

OTHER PUBLICATIONS

"PCT Search Report and Written Opinion", PCT/US2012/027156, (May 30, 2012), 9 pages.

* cited by examiner

*Primary Examiner* — Ming Hon
(74) *Attorney, Agent, or Firm* — Blakely, Sokoloff, Taylor & Zafman LLP

(57) ABSTRACT

A method disclosed. The method includes downloading a first print job data stream from a cloud computing network, transmitting the first print job data stream to a printer, monitoring a printing status of the printer to determine when the printer is ready to receive a second print job and downloading a second print job data stream from the cloud computing network upon determining that the printer is ready to receive the second print job.

30 Claims, 3 Drawing Sheets

PRINT PROCESSING NETWORK

FIELD OF THE INVENTION

The invention relates to the field of computer systems, and in particular, to processing print jobs received from a public network.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from order entry and management through the complete printing process. However, it may be desirable in future applications to implement a printing system in which the printing software is operated within a computing network cloud. In such an application, the print server would not have a dedicated connection to the printer. Since the printer is to receive print jobs via a cloud connection, there is an unpredictable flow of received print job data, which results in pauses at the printer. Pauses at high speed printers are undesirable due to inefficiencies of use.

Accordingly, a mechanism to maximize the efficiency of a printer coupled to a cloud computing network is desired.

SUMMARY

In one embodiment, a method includes downloading a first print job data stream from a cloud computing network, transmitting the first print job data stream to a printer, monitoring a printing status of the printer to determine when the printer is ready to receive a second print job and downloading a second print job data stream from the cloud computing network upon determining that the printer is ready to receive the second print job.

Another embodiment discloses a printing system including a printer to apply data to a print medium and a server. The server downloads a first print job data stream from a cloud computing network, transmits the first print job data stream to the printer, monitors a printing status of the printer and downloads a second print job data stream from the cloud computing network upon determining that the printer is ready to receive a second print job.

BRIEF DESCRIPTION OF THE DRAWINGS

A better understanding of the present invention can be obtained from the following detailed description in conjunction with the following drawings, in which.

DETAILED DESCRIPTION

A mechanism for processing print jobs received via a cloud computing network is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
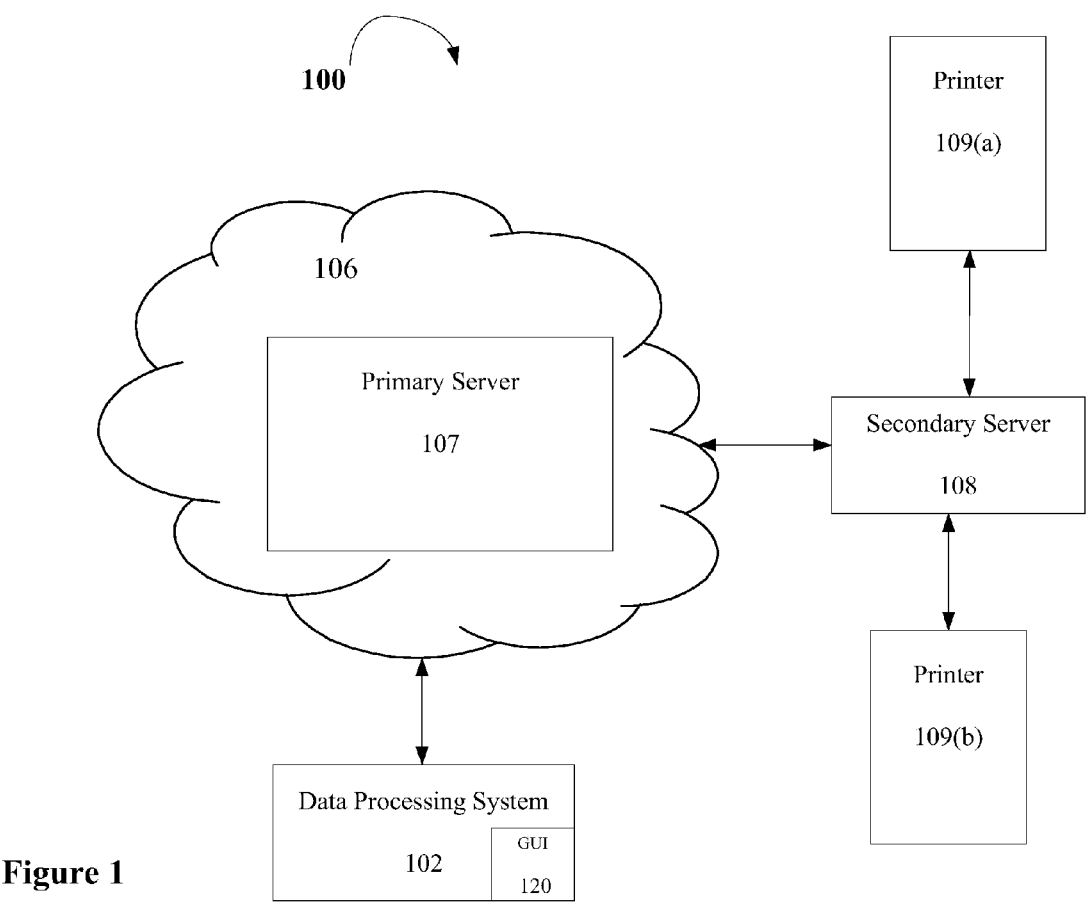
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

According to one embodiment, network 106 is a public network, such as a Wide Area Network (WAN) or cloud computing network. In such an embodiment, network 106 includes a primary print server 107 that serves print requests via network 106 to printers 109. Primary print server 107 may include a print queue for print jobs requested by remote data processing systems.

According to one embodiment, primary server 107 is a cloud server that implements a printing software product to manage the printing of documents received from one or more data processing systems 102 at one or more of printers 109. In one embodiment, the printing software product may be implemented using either InfoPrint Manager (IPM) or InfoPrint ProcessDirector (IPPD), although other types of printing software may be used instead. In a further embodiment, an operator at data processing system 102 may interact with the printing software product at primary server 107 via a graphical user interface (GUI) 120 in order to provide for efficient transmission of print jobs.

Particularly, GUI 120 allows a user to select a desired printer 109 and submit requests for the printing of a document to a printer 109 via primary server 107. In one embodiment, the request is presented using the Advanced Function Presentation (AFP™) system developed by International Business Machines Corporation.

According to the AFP system, documents may include combinations of text, image, graphics, and/or bar code objects in device and resolution independent formats. Documents may also include and/or reference fonts, overlays, and other resource objects, which are required at presentation time to present the data properly. In AFP a Mixed Object Document Content Architecture (MO:DCA) data stream is provided to primary server 107.

According to one embodiment, the AFP MO:DCA data streams are object-oriented streams including, among other things, data objects, page objects, and resource objects. Primary server 107 processes pages of output that mix all of the elements normally found in presentation documents (e.g., text in typographic fonts, electronic forms, graphics, image, lines, boxes, and bar codes). The AFP MO:DCA data stream includes architected, structured fields that describe each of these elements.

In one embodiment, a secondary print server 108 downloads the processed pages of print job data from primary server 107 for printing at one of printers 109. In such an embodiment, secondary print server 108 receives the print job data from network 106 via a Virtual Private Network (VPN). Secondary print server 108 subsequently converts the downloaded data to an Intelligent Printer Data Stream (IPDS) for communication with printers 109.

The IPDS data stream is similar to the AFP data steam, but is built specific to the destination printer 109 in order to integrate with each printer's specific capabilities and command set, and to facilitate the interactive dialog between the secondary print server 108 and the printer 109. The IPDS data stream may be built dynamically at presentation time (e.g., on-the-fly in real time). Thus, the IPDS data stream is provided according to a device-dependent bi-directional command/data stream.

Although described as separate entities, other embodiments may include secondary server 108 being incorporated in one or more of the printers 109. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

Figure 2:
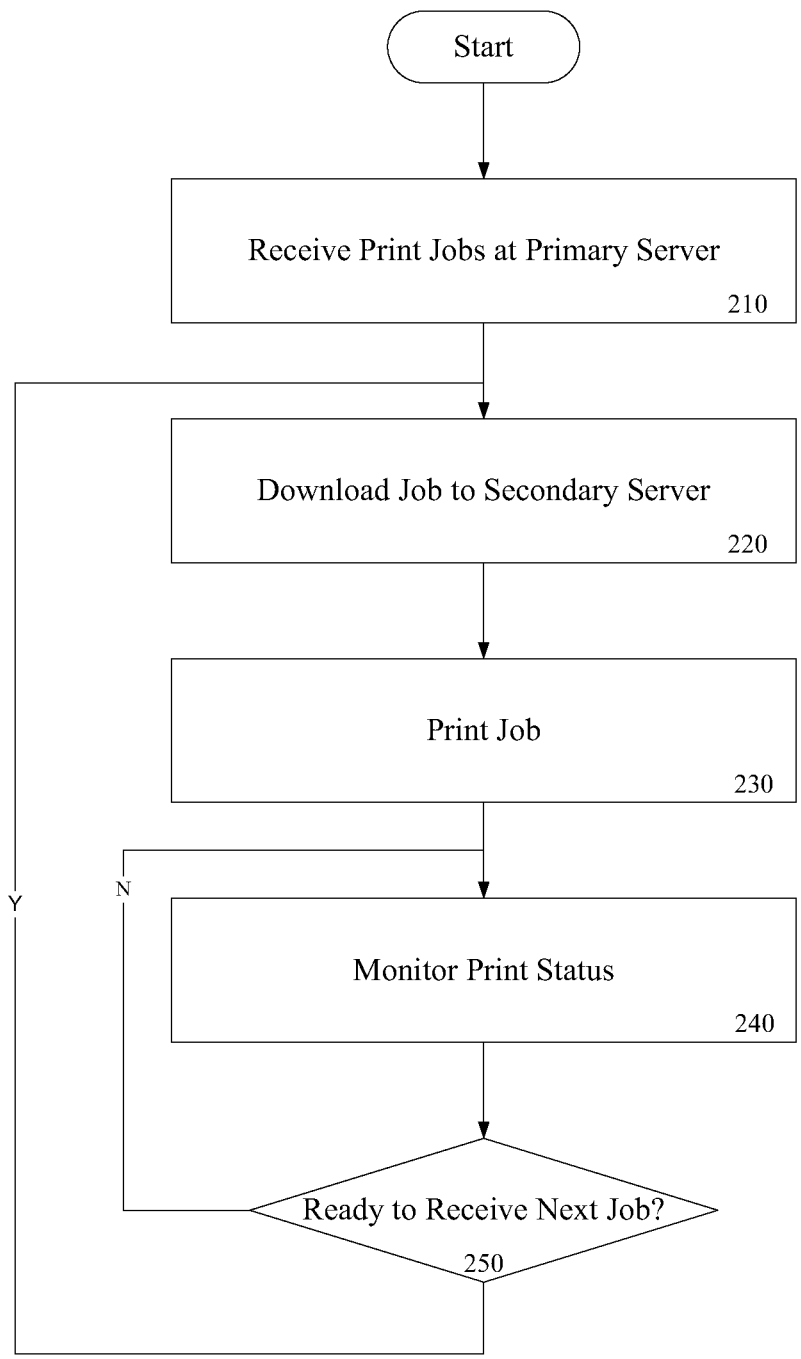
FIG. 2 is a flow diagram illustrating one embodiment of processing print jobs using a cloud computing network.

FIG. 2 is a flow diagram illustrating one embodiment of processing print jobs using a cloud computing network. At processing block 210, print jobs are received at primary print server 107 from a data processing system 102. As discussed above, primary server 107 includes a printing software product that processes received print job data. At processing block 220, secondary print server 108 downloads the processed data from primary server 107. In one embodiment, secondary server 108 performs a secure copy from a Network File System (NFS) directory to a local directory.

At processing block 230, secondary server 108 immediately begins to segment and forward the print the job to a selected printer 109 upon completing the download. At processing block 240, secondary server 108 monitors the status of the print job. In one embodiment, secondary server 108 monitors all print jobs being processed at each printer 109 by monitoring buffers of the printers. While monitoring printer 109, secondary server 108 calculates the time remaining to complete current print job(s) printing at the printer 109.

At decision block 250, it is determined whether another print job is ready to be received. According to one embodiment, secondary server 108 determines that another print job is ready to be received by calculating a time to download (e.g., based on size of job and network 106 data transfer speed) and begin printing the next print job and comparing that time to the time remaining to complete current print job(s) at the printer 109. Once the time to download and begin printing the next print job is approximately equivalent to the time to complete printing at printer 109, printer 109 is ready to receive another job.

In a further embodiment, secondary server 108 takes into consideration the number of printers 109 it is driving when requesting additional print jobs. For instance, secondary server 108 recognizes that the more printers 109, the longer to copy jobs from server 107 because of simultaneous downloads. Thus, secondary server 108 avoids flooding network 106 with large print jobs that are not yet needed by keeping data on the secure cloud server as much as possible.

If secondary server 108 determines that printer 109 is ready to receive another job, control is returned to processing block 220 where secondary server 108 begins to download the next print job from primary server 107. Otherwise control is returned to processing block 240 where secondary server 108 continues to monitor the status of the print job.

The above-described process prevents pausing or clutching at printers 109 attributed to receiving print jobs from a cloud computing network, while enabling print job data to remain on a secure cloud server for as long as possible.

Figure 3:
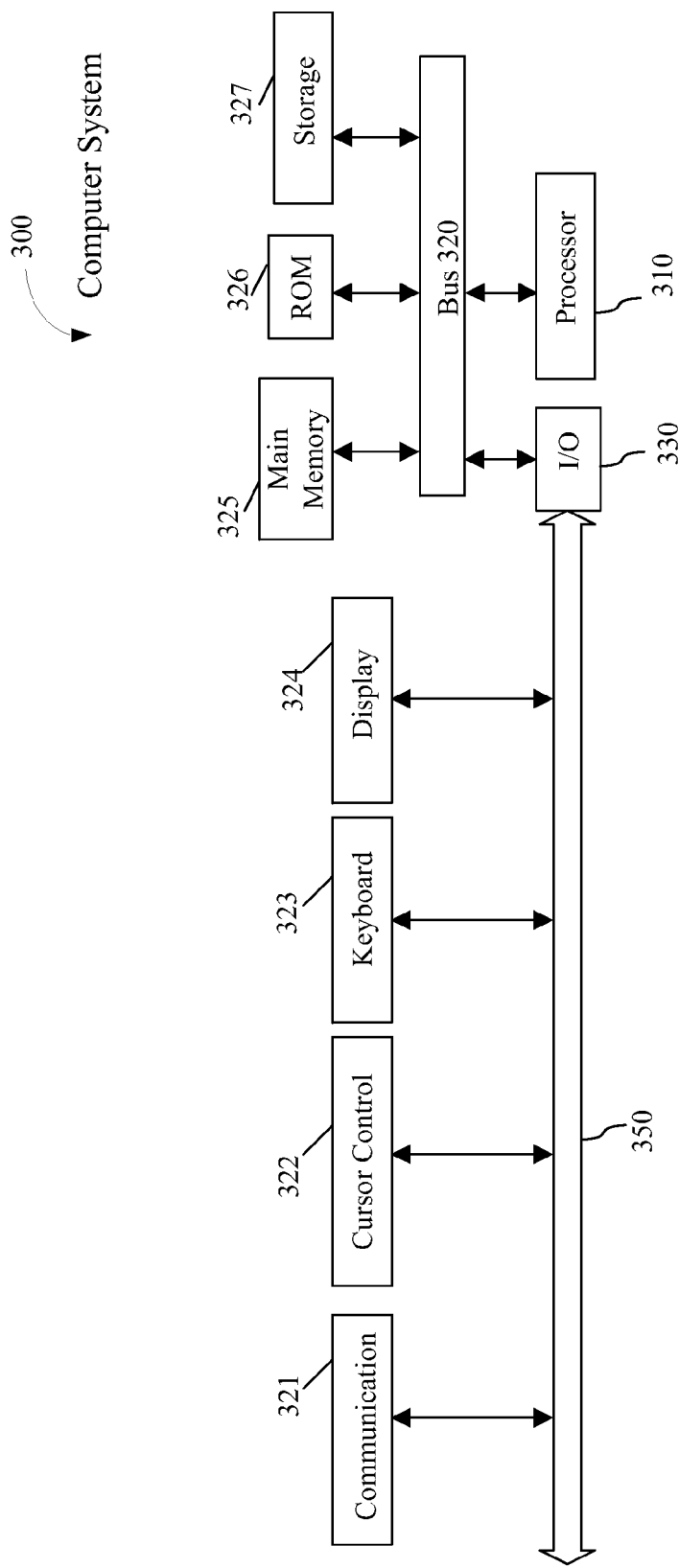
FIG. 3 illustrates one embodiment of a computer system.

FIG. 3 illustrates a computer system 300 on which data processing system 102 and/or servers 107 and 108 may be implemented. Computer system 300 includes a system bus 320 for communicating information, and a processor 310 coupled to bus 320 for processing information.

Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and or other static storage device 326 coupled to bus 320 for storing static information and instructions used by processor 310.

A data storage device 325 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 324, an input device (e.g., an alphanumeric input device 423 and or a cursor control device 422). The communication device 321 is for accessing other computers (servers or clients). The communication device 321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
a secondary print server downloading a first print job data stream from a primary print server implemented in a cloud computing network;
transmitting the first print job data stream from the secondary print server to a printer;
the secondary print server monitoring a printing status of the printer to determine when the printer is ready to receive a second print job by:
calculating a time to complete printing the first print job;
calculating a time to download a second print job data stream from the primary print server and begin printing the second print job data stream; and
comparing the time to download and begin printing the second print job data stream to the time to complete printing the first print job; and
the secondary print server downloading a second print job data stream from the primary print server upon determining that the printer is ready to receive the second print job.

2. The method of claim 1 further comprising:
transmitting the second print job data stream to the printer; and
monitoring the printing status of the printer to determine when the printer is ready to receive a third print job.

3. The method of claim 2 wherein monitoring the printing status of the printer comprises monitoring the status of the first print job and the second print job at the printer.

4. The method of claim 1 further comprising converting the first and second print job data streams to a second data stream format prior to transmitting to the printer.

5. The method of claim 1 wherein calculating the time to download and begin printing a second print job data stream is based on the size of the print job data stream and a data transfer speed between the primary and secondary print servers.

6. The method of claim 1 wherein the printer is ready to receive the second print job when the time to download and begin printing the second print job data stream is equal to the time to complete printing the first print job.

7. The method of claim 1 wherein downloading the first and second print job data streams comprises performing a secure copy from a Network File System (NFS) directory at a cloud server.

8. The method of claim 7 wherein the secure copy is performed via a virtual private network (VPN).

9. A printing system, comprising:
a printer to apply data to a print medium; and
a secondary print server to download a first print job data stream from a primary print server implemented in a cloud computing network, transmit the first print job data stream to the printer, monitor a printing status of the printer by calculating a time to complete printing the first print job by calculating a time to download a second print job data stream from the primary print server and begin printing the second print job data stream, and comparing the time to download and begin printing the second print job data stream to the time to complete printing the first print job, and download a second print job data stream from the cloud computing network upon determining that the printer is ready to receive a second print job.

10. The printing system of claim 9 wherein the server further transmits the second print job data stream to the printer and monitors the printing status of the printer to determine when the printer is ready to receive a third print job.

11. The printing system of claim 10 wherein the server monitors the status of the first print job and the second print job at the printer.

12. The printing system of claim 9 wherein the first and second print job data streams are Advanced Function Presentation (AFP) data streams.

13. The printing system of claim 12 wherein the server converts AFP data streams to Intelligent Printer Data Stream (IPDS) data streams prior to transmitting to the printer.

14. The printing system of claim 9 wherein calculating the time to download and begin printing a second print job data stream is based on the size of the print job data stream and a data transfer speed between the primary and secondary print servers.

15. The printing system of claim 9 wherein the server determines that the printer is ready to receive the second print job when the time to download and begin printing the second print job data stream is equal to the time to complete printing the first print job.

16. The printing system of claim 9 wherein the server downloads the first and second print job data streams by performing a secure copy from a Network File System (NFS) directory at a cloud server.

17. The printing system of claim 16 wherein the secure copy is performed via a virtual private network (VPN).

18. The printing system of claim 9 further comprising a second printer.

19. The printing system of claim 18 wherein the server monitors the first and second printers during printing of the first and second print job data streams.

20. An article of manufacture comprising a non-transitory machine-readable medium including data that, when accessed by a machine, cause the machine to perform operations comprising:
a secondary print server downloading a first print job data stream from a primary print server implemented in a cloud computing network;
transmitting the first print job data stream from the secondary print server to a printer;
the secondary print server monitoring a printing status of the printer to determine when the printer is ready to receive a second print job by:
calculating a time to complete printing the first print job;
calculating a time to download a second print job data stream from the primary print server and begin printing the second print job data stream; and
comparing the time to download and begin printing the second print job data stream to the time to complete printing the first print job; and
the secondary print server downloading a second print job data stream from the primary print server upon determining that the printer is ready to receive the second print job.

21. The article of manufacture of claim 20 comprising a machine-readable medium including data that, when accessed by a machine, further cause the machine to perform operations comprising:
transmitting the second print job data stream to the printer; and monitoring the printing status of the printer to determine when the printer is ready to receive a third print job.

22. The article of manufacture of claim 20 wherein monitoring the printing status of the printer comprises monitoring the status of the first print job and the second print job at the printer.

23. The article of manufacture of claim 20 comprising a machine-readable medium including data that, when accessed by a machine, further cause the machine to perform operations comprising converting the first and second print job data streams to a second data stream format prior to transmitting to the printer.

24. The article of manufacture of claim 20 wherein calculating the time to download and begin printing a second print job data stream is based on the size of the print job data stream and a data transfer speed between the primary and secondary print servers.

25. The article of manufacture of claim 20 wherein the printer is ready to receive the second print job when the time to download and begin printing the second print job data stream is equal to the time to complete printing the first print job.

26. The article of manufacture of claim 20 wherein downloading the first and second print job data streams comprises performing a secure copy from a Network File System (NFS) directory at a cloud server.

27. A printing network, comprising:
a primary print server implemented in a cloud computing network including a printing software product to process print job data streams;
a second server to download a first print job data stream from the cloud computing network server, convert the first print job data stream to a second data stream format and transmit the first print job data stream; and
a printer to apply the first print job data stream to a print medium,
wherein the server monitors a printing status of the printer by calculating a time to complete printing the first print job by calculating a time to download a second print job data stream from the primary print server and begin printing the second print job data stream, and comparing the time to download and begin printing the second print job data stream to the time to complete printing the first print job, and downloads a second print job data stream from the cloud computing network server upon determining that the printer is ready to receive a second print job.

28. The printing network of claim 27 wherein the first and second print job data streams are Advanced Function Presentation (AFP) data streams.

29. The printing network of claim 28 wherein the second server converts AFP data streams to Intelligent Printer Data Stream (IPDS) data streams.

30. The printing network of claim 27 wherein calculating the time to download and begin printing a second print job data stream is based on the size of the print job data stream and a data transfer speed between the primary and secondary print servers.

\* \* \* \* \*